Nov. 30, 1954
J. S. PAGE
2,695,623
FLOW CONTROL FOR FLUID HANDLING LINES
Filed April 18, 1949
3 Sheets-Sheet 1
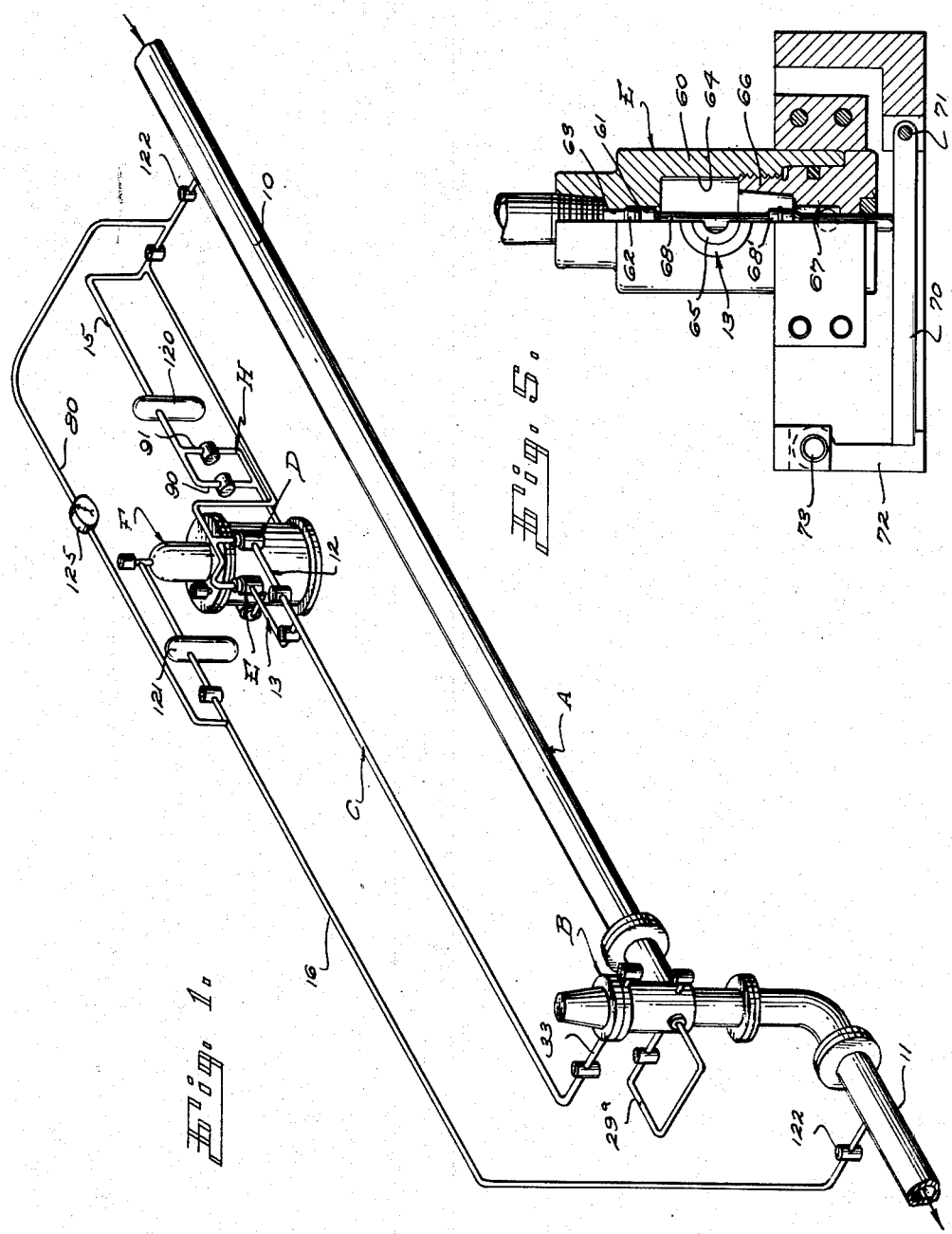
INVENTOR.
John S. Page
BY
Attorney

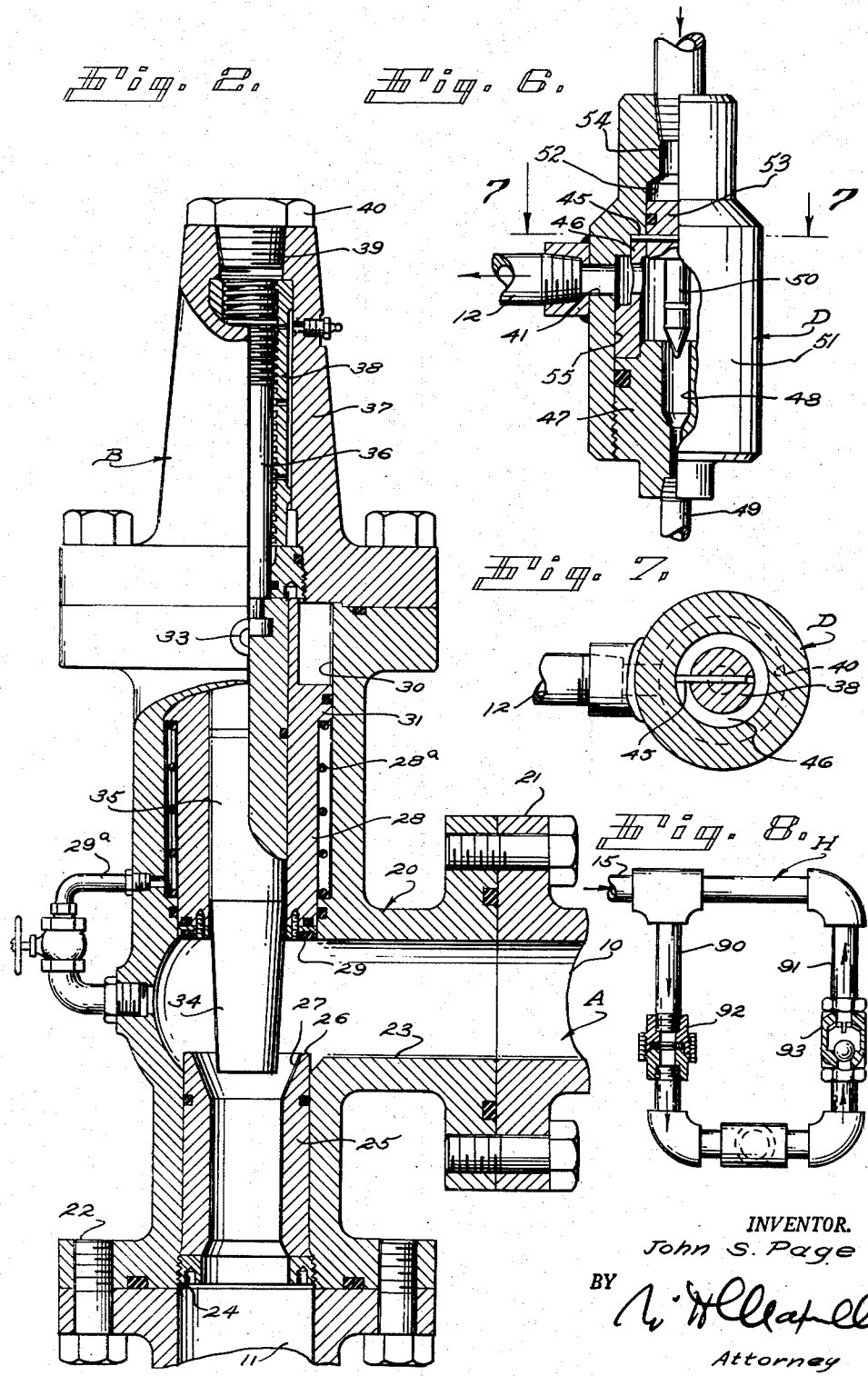

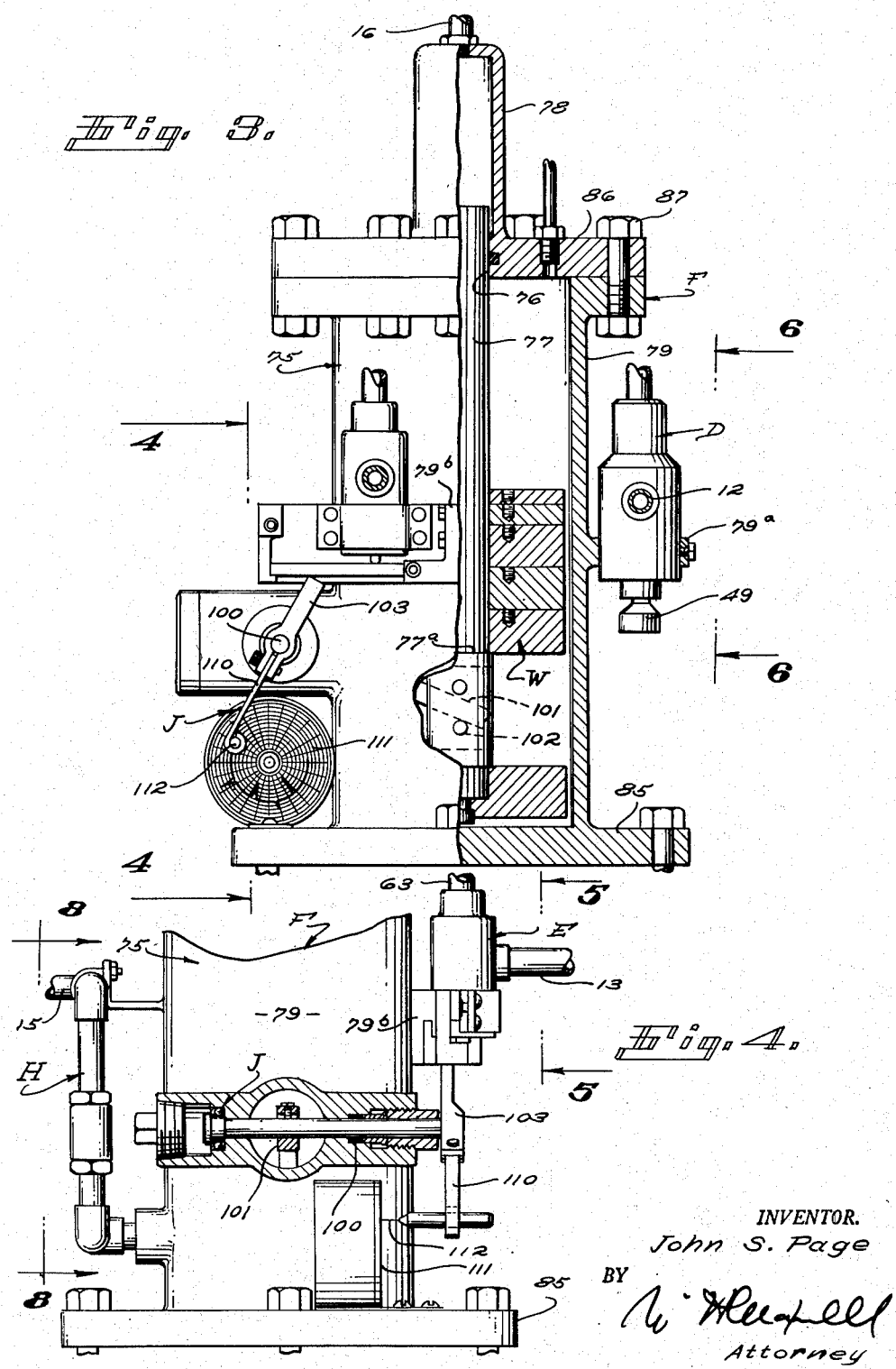

United States Patent Office 2,695,623
Patented Nov. 30, 1954

2,695,623

FLOW CONTROL FOR FLUID HANDLING LINES

John S. Page, Long Beach, Calif., assignor to Page Oil Tools Inc., Long Beach, Calif., a corporation of California Application April 18, 1949, Serial No. 88,212

5 Claims. (Cl. 137—70)

This invention relates to a flow control for fluid handling lines and it is a general object of the invention to provide a control for a line which is responsive to pressure in the line and to excessive pressure drop in the line such as may prevail over a predetermined period of time.

The apparatus of the present invention is combined with or is applicable to a pipe line or the like handling fluid under pressure, and it involves, generally, a master valve operable to shut off or stop flow through the main line, which valve preferably includes variable or adjustable throttling means so that it acts normally as a flow control as well as a stop valve. The apparatus further includes a control line that extends from the master valve to the up stream section of the main line, and in its preferred form the control line has parallel sections, which sections are individually closed by stop means that are normally in closed position but which are subject to operation so as to open, allowing pressure on the upstream section of the main line to act in the master valve to close it. One of the stop means in the control line is responsive to excessive pressure in the upstream section of the main line while the other is responsive to an excessive pressure drop occurring around the master valve and is under control of a time delay mechanism so that it only operates when excessive pressure drop occurs over a predetermined length of time.

The apparatus of the present invention is useful in various situations or with various apparatus handling fluids. However, it is particularly useful in connection with or as applied to a flow handling line or pipe and therefore will be described as applied to a main pipe line which may be considered as handling a liquid such as oil or the like. As a typical practical use to which the invention may be applied it may be explained as being applicable to an oil line where oil is handled from a source such as wells, and is conducted by the main line to reservoirs, separators, or other equipment at a point remote from the wells. In such a situation the pressure or head at which the liquid is supplied to the main line varies sometimes through a substantial range of conditions and a substantial pressure drop may occur in the line if a break should occur in the downstream section of the line or if that portion of the line should be accidentally opened or if any one of a number of conditions should arise.

It is a general object of this invention to provide apparatus combined with or applicable to a line such as a main flow line, which apparatus includes a master valve operable as a stop controlling flow through the line and which apparatus further includes means responsive to excessive pressure acting so that when excessive pressure occurs on the upstream side of the line the master valve is closed. There is a further object of the invention to provide apparatus of the general character referred to including means responsive to pressure drop across the master valve and regulated in action by a time delay so that if a predetermined pressure drop occurs across the master valve over a predetermined length of time, the master valve is operated so that it closes.

It is another object of the present invention to provide apparatus of the general character referred to including a control line to a master valve, which control line has parallel sections each of which is equipped with a normally closed stop means, one of the stop means being operable in response to excessive pressure in the flow line and the other being operable in response to a predetermined pressure drop occurring across the master valve.

The various objects and features of my invention will be fully understood from the following detailed description of a typical preferred form and application of the invention, throughout which description reference is made to the accompanying drawings, in which:

Fig. 1 is a diagrammatic view of the apparatus provided by the present invention showing it applied to or incorporated in connection with a main flow handling line. Fig. 2 is a vertical sectional view illustrating the master valve employed in carrying out the present invention. Fig. 3 is a view of the time control mechanism for the stop means which is employed in the control line and which is responsive to pressure drop across the master valve, parts of the mechanism being shown in section. Fig. 4 is a view taken as indicated by line 4—4 on Fig. 3. Fig. 5 is a view of the stop means employed in the control line and which is regulated by the time delay mechanism illustrated in Fig. 3. Fig. 6 is a view of the stop means employed in the control line and which is reponsive to excessive pressure in the upstream section of the main line, part of the structure being shown in section. Fig. 7 is a detailed transverse sectional view taken as indicated by line 7—7 on Fig. 6, and Fig. 8 is a view taken as indicated by line 8—8 on Fig. 4, certain of the parts being shown in section.

The form of the invention illustrated in the drawings is applied to what may be termed a main flow line A which line has what will be termed an upstream section 10, and a downstream section 11. The invention provides a master valve B in the line A which valve occurs between the sections of the line and handles the flow from section 10 of the line to section 11 thereof. The master valve is primarily a stop or shut off valve which is normally open so that under normal conditions there is free flow of fluid between the sections 10 and 11 and the main line A. In practice it is preferred that the master valve be of the type of construction which is more fully described and which is the subject of my co-pending application entitled Multiple Valve, filed April 18, 1949, Serial No. 88,211.

In this particular type of valve there is a positive stop or shut off means and also a throttling or regulating means which latter means is subject to regulation or adjustment so that the master valve may be set or adjusted to regulate flow between the sections 10 and 11, with the result that there is normally a predetermined pressure drop between the sections 10 and 11 of the main line or across the valve B. It is to be understood, of course, that in practice the throttling or regulating means of valve B may be so set or adjusted that the pressure drop occurring at the master valve is but slight since under ordinary circumstances it is not desired that a substantial pressure loss be suffered at such point in the line.

The present invention provides in addition to the master valve B a control line C which extends from the upstream section 10 of the main line A to the master valve B to supply operating pressure thereto, and the control line is characterized by parallel sections 12 and 13, each of which may serve to conduct operating fluid to the valve B. In accordance with the present invention the section 12 of the control line C is provided with a stop means D while the section 13 of line C is provided with a stop means E. The stop means D is a pressure responsive device subject or responsive to excessive pressure occurring in the upstream section 10 of the main line A, which pressure is communicated to means D by the control line C upstream from the sections 12 and 13. The stop means E is a normally closed device under control of a time delay mechanism F which is coupled to the upstream section 10 of the main line A by a pressure connection 15 and with the downstream section 11 of the line A by a pressure connection 16.

The master valve, as shown in the drawings, has a body 20 connected between the upstream and downstream sections of the main line A through suitable connections 21 and 22, respectively. The body formed as shown in Fig. 2 has an inlet passage 23 receiving fluid from the lines section 10 and has an outlet passage 24 passing fluid to the downstream section 11. The master valve constructed as shown in the drawings involves a seat element 25 with concentric seats 26 and 27, the seat 26 being an outer flat upwardly facing seat while the seat 27 is an inner tapered seat. The valve includes a shut-off valve 28 slidably mounted in the body to operate or reciprocate relative to the seat element 25 and in the case illustrated the valve member 28 has an end section 29 which opposes the element 25 and which is operable into engagement with the outer seat 26 of the element 25. The valve member 28 is normally up or open so there is free flow through the valve, but when it is lowered or actuated it engages the seat 26 and closes or shuts off flow through the structure. Operating means for the valve 28 is preferably a fluid pressure actuated means and as shown in the drawings it involves a cylinder 30 in the valve body and a piston 31 on the valve 28 operating in the cylinder 30. Operating fluid under pressure admitted through an inlet opening 33 acts on the piston 31 forcing it down in the cylinder 30 so that the valve 28 is moved to closed position.

A second or regulating valve 34 is provided in the structure and is such as to cooperate with the seat 27. The valve 34 has a shank portion 35 carried in the valve member 28 and it is normally positioned to have something of a restricting action on flow through the master valve so that the desired pressure drop occurs between the sections 10 and 11 of the main line. The operating means provided for the regulating valve 34 involves a stem 36 projecting up from the shank 35 and threaded in an extension 37 of the body. In the case illustrated the extension 37 has a liner 38 fixed therein and the stem 36 is threaded in the liner. The stem 36 is accessible through an access opening 39 in the upper end of the extension 37 and when the closure 40 for opening 39 is removed the stem can be engaged to adjust the position of valve 34 relative to seat 27.

The master valve as shown in the drawings involves or includes a spring 28ª which surrounds the valve 28 and normally yieldingly holds it in the up or open position shown in Fig. 2. Further, the master valve may include various other features which make for simple, dependable operation, for instance, it may involve a drain connection 29ª from the space in cylinder 30 below piston 31 to the main flow passage through the valve so that fluid is not trapped beneath the piston 31.

The control line C serves primarily to connect the upper section 10 of the line A with the master valve B, that is, with the inlet 33 of valve B, and at a suitable point it is provided with the parallel sections 12 and 13 which sections are normally closed by means D and E, respectively. It will be apparent that when either means D or means E is open flow from the upper section of the line A enters the master valve B and acts therein to close the stop valve and thus shut off flow from line section 10 to line section 11.

The stop means D in section 12 of control line C may be in the nature of a plug valve and in the form illustrated in the drawings it involves a body 51 with a cylindrical opening 52 carrying a plug 53. An inlet port 54 enters the body 51 from one end and communicates with the bore 52 so that pressure occurring in the upstream section 10 of the main line A is communicated to the plug 53 in the cylinder 52. A counterbore 55 is provided in the body 51 below or beyond the bore 52 and an outlet port 41 communicates with the counterbore and the control line C extends from the outlet port 41 to the inlet 33 of the master valve. In practice any suitable means may be provided to normally hold the plug 53 in an up or closed position such as is shown in Fig. 6, so that no flow occurs through or in the section 12 of the control line C. The means provided to hold the plug is preferably such as to fail or release under predetermined pressure exerted on the plunger or plug 38 and in the form of the invention illustrated this means is provided by a break or shear pin 45. The shear pin 45 is carried in a lateral opening provided in the plug 53 and it is normally held or retained by an abutment 46 carried in the counterbore 55. The abutment is retained in operated position by a closure 47 threaded or otherwise engaged in the outer or lower end of the counterbore as shown in Fig. 6. By forming the shear pin 45 of suitable size and of suitable material it fails when the desired pressure occurs on the plug 53 and when the pin fails the plug 53 moves down so that free communication is established between port 53 and port 41, with the result that pressure from the upstream section 10 of the main line A is communicated through control line C to the master valve B causing the stop valve 28 thereof to be closed.

In the preferred form of the invention a drain opening 48 is provided in the closure 47 of means D and a drain line 49 connects with the opening 48. An extension 50 of the plug 53 is normally clear of the opening 48 and is in line therewith so that when the plug 53 is operated or moved down the extension 50 enters and closes the drain opening 48. Through this construction any fluid that might leak past the plug 53 when it is in the up position shown in Fig. 6 will not develop pressure in the control line C such as might cause operation of the master valve B even though the shear pin 45 has not been broken.

The stop means E provided in the other section 13 of control line C is preferably in the nature of a plug valve involving a body 60 having a cylindrical opening 61 therein and a plug 62 normally closes the opening 61. An inlet port 63 enters the end of body 60 and the section 10 of line A communicates pressure to the port 63 so that it normally acts on the plug 62 in the cylinder opening 61. The body 60 has a counterbore 64 below and in communication with the cylinder 61 and a lateral outlet opening 65 is provided in communication with the counterbore 64 so that when the plug 62 is actuated down and out of the bore 61, flow occurs from the inlet port 63 to the outlet port 65 and, consequently, through the section 13 of line C so that operating pressure is supplied to the master valve B.

The means E is provided with a plug 66 which normally closes the lower end of the counterbore 64 and a drain opening 67 is provided in the closure. A stem 68 depends from the plug 62 through the closure 66 to depend therefrom and an enlargement or stopper 68' on the stem enters the drain opening 67 to close it when the plug 62 is out of the bore 61.

The present invention provides means normally releasably holding the plug 62 in the up or closed position shown in Fig. 5 of the drawings. The particular means illustrated is a mechanical or latch means and it involves a lever 70 pivoted at 71 and normally held up by a latch 72 which is pivoted at 73. The lever 70 engages under the lower end of stem 68 and normally holds the stem and its plug 62 in the up position shown in Fig. 5.

The time delay means F provided by the present invention operates in response to pressure drop that occurs between the sections 10 and 11 of the main line A and acts to open the means E only when a predetermined pressure drop prevails over a predetermined length of time. The particular means F illustrated in the drawings is a fluid pressure actuated means and in the construction illustrated it involves a body 75 having a cylindrical opening 76 slidably passing a ram 77. A chest 78 extends in one direction from the cylindrical opening 76 and a chest 79 extends in the opposite direction from the said cylindrical opening 76. The chest 78 is connected with the downstream section 11 of the main line A by a pressure line 16. The chest 79 is shown connected to the upstream section 10 of the main line A by pressure line 15 illustrated in Fig. 1 as a branch of the control line C.

The ram 77, being slidably carried in the cylindrical opening 76 has its ends exposed to the pressures that occur in the chests 78 and 79 and if equal pressures occurred in both chests the ram would remain stationary at all times. However, it will be apparent that if a differential pressure occurs in the chests such as would result from a pressure drop across the master valve B there would be a difference in pressure in the chests and the ram would operate in one direction or the other. If the pressure is greater in the chest 79 the ram will operate from the chest 79 into the chest 78. Since the master valve is normally set so that there is a pressure drop across it and therefore a pressure differential between sections 10 and 11, weights W are applied to the ram 77 in chest 79 to counterbalance the normal tendency of the ram to move from chest 79 into chest 78. It will be apparent that by applying suitable weights to the ram 77, as shown in Fig. 3, the ram is weighted to balance or offset the tendency of the ram to move due to the differential in pressure in chests 78 and 79. However, should an excess of pressure occur in chest 79 due, for example, to failure or opening of line section 11, then the ram 78 will move up in spite of its being weighted or counterbalanced.

The time delay mechanism F which operates or controls the stop means E preferably forms a support or carrier for the stop means E, and it may also carry the stop means D. In the case illustrated the cylindrical chest 79 of the means F is of substantial size to accommodate the ram 77 and the weights W and it is provided with projecting brackets 79ª and 79ᵇ which carry the stop means D and E, respectively. The chest 79 is shown provided with a base flange 85 by which it can be secured to a suitable support and in the construction illustrated the element 86 of the means F, which is provided with the cylinder opening 76, is in the nature of a flange which is secured to and which forms a closure for the upper end of chest 79. Releasable fasteners such as screw fasteners 87 connect the part 86 to the upper end of the chest 79 and when it is desired to adjust or vary the weights W on the ram 77 the fasteners 87 are released and the element 86 removed from the chest 79. In the particular case illustrated the weights W are annular members that may be slid onto the ram 77 from its upper end to be supported on a shoulder 77ª which faces upwardly on the lower end portion of the ram.

In practice it is desirable to employ a fine or highly refined fluid such as an oil in the actuator F and parts which are accessories thereto, so that the timing section of this element is accurate and dependable. From the foregoing description it will be apparent that pressure connections are established between the main line A and the means F in order to gain the desired action of the means F. In practice it is preferred to provide traps 120 and 121 in the lines 15 and 16, respectively, so that fluid handled by the main line A is kept separate from the fluid employed in the means F.

In accordance with the present invention a flow control means H is provided in connection with the means F to prevent sudden operation or surging of the means F even though there may be a substantial pressure drop across the master valve B. The means H preferably includes parallel sections 90 and 91 in the pressure line 15 which connects the upstream section 10 of line A with the means F. Two fittings are provided in the sections 90 and 91, one of these fittings being an orifice fitting 92 in connection 90 and the other being a check valve 93 in section 91. The orifice fitting 92 involves an orifice plate which materially restricts flow through section 90 and consequently through the pressure line 15 so that even though a substantial pressure drop occurs between sections 10 and 11 of the main line A, flow into the chest 79 of means F is retarded or restricted, with the result that it takes a substantial period of time before the ram 77 is moved through the limit of its stroke upward in cylindrical opening 76. If at any time, as the ram 77 is being operated upwardly the pressure condition between sections 10 and 11 should be restored to normal, or approximately normal, gravity acts on the ram 77 tending to return it to its normal position, all of which involves displacement of fluid from the chest 79. During this operation the check valve 93 opens, allowing free rapid exhaust or displacement of fluid from the chest 79 so that the means F is quickly restored whenever a normal condition prevails between the line sections 10 and 11.

A suitable operating connection is provided between the ram 77 and the releasable latch mechanism that normally holds the plug 62 of means E in the up and closed position. In the particular case illustrated the connection between these elements involves a rocker pivotally supported at 100 and having an arm 101 which projects into chest 79 and engages between projections 102 on the ram 77 so that as the ram 77 is operated upwardly the arm 101 is swung up. Another or outer arm 103 of the rocker is so disposed with reference to the latch of means E as to engage and release the latch 72 when the ram 77 reaches a predetermined position in its upward travel. It will be apparent, of course, that as soon as the rocker of the means F releases the latch 72 of the means E the means E opens, allowing operating pressure to pass from section 10 of the master valve B, with the result that the master valve is closed.

In practice it is preferred to provide the apparatus with indicating means J which serves to indicate and may even record the operations of means F. In practice the ram 77 of means F may operate within the limits of its stroke without actually releasing the latch of means E, and such operation of the ram may indicate a surging or undesirable variation in pressure in the upstream section 10 or a fluctuation in pressure in the downstream section 11, or both. In order to observe such operations of the ram 77 an indicator 110 may be provided on the rocker which is operated by the ram and if desired a suitably located gauge chart 111 may be related to a marker 112 on the indicator arm 110 so that a record is made of the operations of the ram 77.

It is also to be understood that throughout the apparatus or throughout the system various stop or control valves such as are indicated at 122 may be included in the various connections or lines so that flow can be cut off or controlled as circumstances may require. Further, in practice it is preferred that a suitable gauge 125 be included in the connection or line 80 indicating the pressure drop that occurs across the master valve B.

From the foregoing description it will be apparent that through my present invention I provide a master valve B in the main line A acting to normally regulate flow in the main line so that a predetermined pressure drop occurs between the sections 10 and 11 thereof. Further, it is to be noted that the master valve B contains or involves the stop valve 28 which is subject to fluid pressure actuation in such manner as to close flow between the main line sections 10 and 11. Under normal conditions the master valve B is set or adjusted so that the desired regulation occurs at this point establishing a predetermined pressure drop between sections 10 and 11, and weights W are applied to or incorporated in the means F so that the plunger or ram 77 of means F is normally down when the normal pressure drop prevails between sections 10 and 11. Should an excessive pressure drop prevail between sections 10 and 11 then excessive pressure differential prevails between chests 78 and 79 of means F and the ram 77 moves up. If the pressure differential is great enough and prevails over a long period of time, the ram moves up until the rocker is actuated and the latch of means E is released. It will be understood that the orifice fitting 92 in section 90 of connection 15 determines how long the pressure differential must prevail before the ram 77 reaches the point where the rocker operates the latch. When the latch of means E is actuated the means E is opened and operating pressure is admitted from line section 10 to the master valve B. At any time that excessive pressure occurs in the section 10 of line A it acts on the plunger or plug 53 of means D and when sufficient excess pressure occurs in section 10 the shear pin 45 fails and the means D opens so that operating pressure is communicated to the master valve B causing it to close.

With the construction provided by the present invention, the several elements are capable of simple, accurate adjustment and they are free of delicate or complicated parts subject to failure or inaccurate operation.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. In apparatus applicable to a flow handling line the combination of a master valve insertable in said line to divide it into upstream and downstream sections and operable to shut off flow through said line, a fluid responsive actuating means for operating the valve, a control line having parallel portions and connecting said upstream section of the first mentioned line and the master valve to supply operating pressure to the actuating means from said upstream section, and two normally closed stop means in the control line, one in one of said portions of the control line opening the control line in response to pressure in said upstream section in excess of a predetermined value and the other in the other of said portions of the control line opening the control line in response to a predetermined pressure drop across the master valve.

2. In apparatus applicable to a flow handling line the combination of a master valve insertable in said line to divide it into upstream and downstream sections and operable to shut off flow through said line, a fluid responsive actuating means for operating the valve, a control line connecting said upstream section of the first mentioned line and the master valve to supply operating fluid under pressure from the upstream section to the actuating means at the master valve, said control line having parallel sections, a normally closed stop means in one of the parallel sections opening in response to a predetermined pressure in the control line, and a normally closed stop means in the other of the parallel sections opening in response to a predetermined pressure drop across the master valve.

3. In apparatus applicable to a flow handling line the combination of a master valve insertable in said line to divide it into upstream and downstream sections and operable to shut off flow through said line, a fluid responsive actuating means for operating the valve, a control line with parallel portions and connecting said upstream section of the first mentioned line and the master valve to supply operating pressure to the actuating means at the master valve, and two normally closed stop means one in each of said portions of the control line, one including a shear pin which, upon failure, opens the control line in response to pressure in said upstream section in excess of a predetermined value and the other opening the control line in response to a predetermined pressure drop across the master valve.

4. In apparatus applicable to a flow handling line the combination of a master valve insertable in said line to divide it into upstream and downstream sections and operable to shut off flow through said line, a fluid responsive actuating means for operating the valve, a control line with parallel portions and connecting said upstream section of the first mentioned line and the master valve to supply operating pressure to the actuating means at the master valve, and two normally closed stop means one in each of said portions of the control line, one opening the control line in response to pressure in said upstream section in excess of a predetermined value and the other a latch controlled plug valve opening the control line in response to a predetermined pressure drop across the master valve.

5. In apparatus applicable to a flow handling line the combination of a master valve insertable in said line to divide it into upstream and downstream sections and operable to shut off flow through said line, a fluid responsive actuating means for operating the valve, a control line connecting said upstream section of the first mentioned line and the master valve to supply operating fluid under pressure from the upstream section to the actuating means at the master valve and having two parallel sections, a normally closed stop in one section of the control line opening in response to a predetermined pressure in the control line, and a normally closed stop in the other section of the control line opening in response to a predetermined pressure drop across the master valve, the last mentioned stop including a time control.

References Cited in the file of this patent

UNITED STATES PATENTS

| Number | Name | Date |
|---|---|---|
| 647,758 | Orr | Apr. 17, 1900 |
| 1,156,165 | McManamy | Oct. 12, 1915 |
| 1,322,906 | Kimball | Nov. 25, 1919 |
| 1,514,839 | Edwards | Nov. 11, 1924 |
| 1,600,337 | Johnson | Sept. 21, 1926 |
| 2,071,375 | Allen | Feb. 23, 1937 |
| 2,072,314 | Rhodes | Mar. 2, 1937 |
| 2,081,542 | Kidney | May 25, 1937 |
| 2,160,766 | Thomason | May 30, 1939 |
| 2,397,103 | Haberstump | Mar. 26, 1947 |
| 2,418,743 | Baker | Apr. 8, 1947 |

FOREIGN PATENTS

| Number | Country | Date |
|---|---|---|
| 483,837 | France | May 22, 1917 |
| 564,436 | Great Britain | 1944 |